Aug. 23, 1932.  F. A. CECIL  1,873,823
COMBINATION TIRE CARRIER AND REFLECTING BODY
Filed May 26, 1930
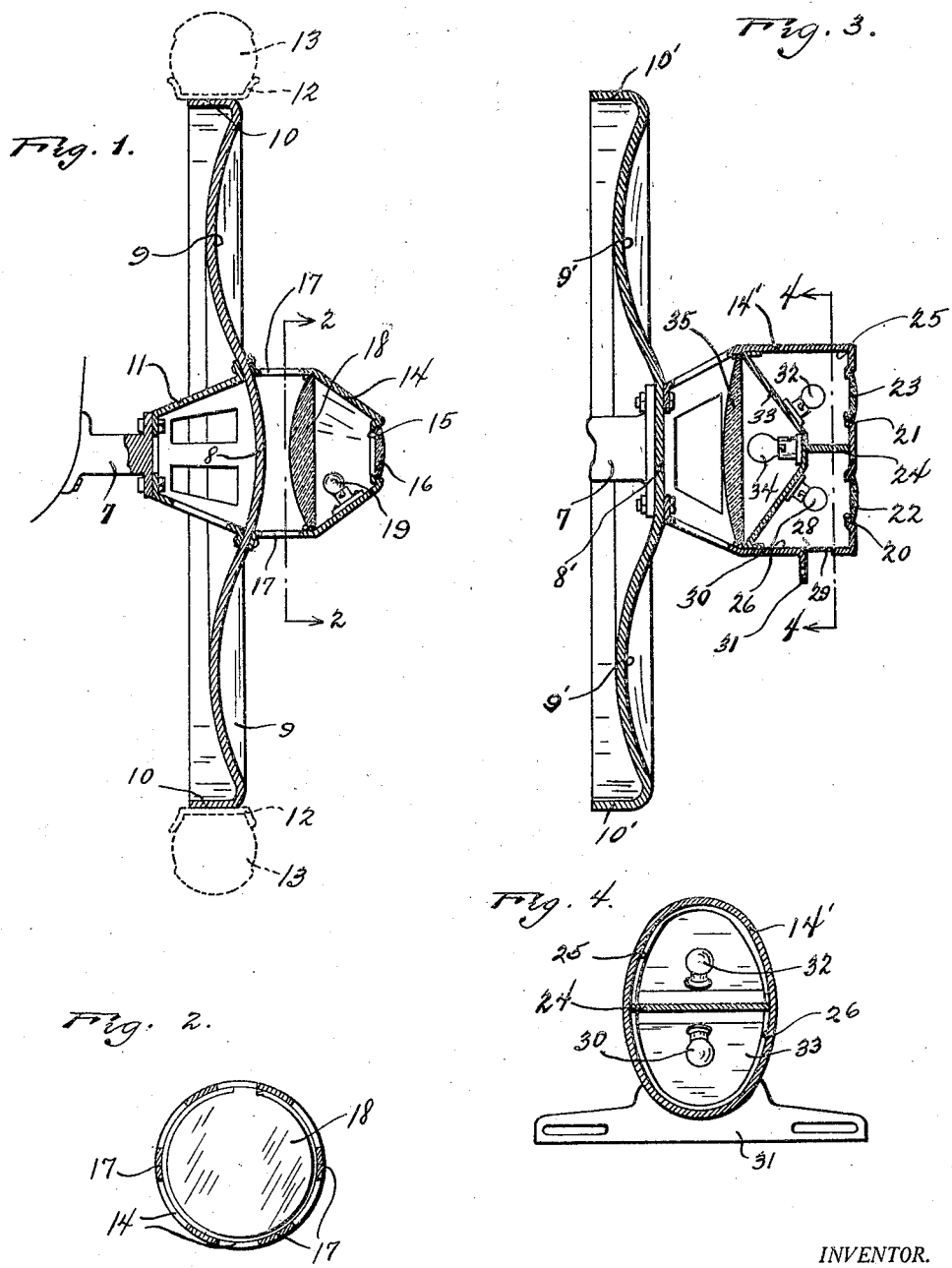
INVENTOR.
Frank A. Cecil
BY
ATTORNEY.

Patented Aug. 23, 1932

1,873,823

UNITED STATES PATENT OFFICE

FRANK A. CECIL, OF DETROIT, MICHIGAN

COMBINATION TIRE CARRIER AND REFLECTING BODY

Application filed May 26, 1930. Serial No. 455,564.

My invention relates to a new and useful improvement in a combination tire carrier and reflecting body adapted for use on vehicles to co-operate with a light bulb so as to present a large reflecting body from which the light of the light bulb is reflected.

It is an object of the present invention to augment the protection afforded by the usual tail light or stop light so as to display to the drivers of following vehicles a larger illuminated surface indicating the presence of the vehicle.

It is another object of the present invention to provide a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical view of the invention.

Fig. 2 is a view taken on line 2—2 of Fig. 1.

Fig. 3 is a central sectional view of a modified form of the invention.

Fig. 4 is a view taken on line 4—4 of Fig. 3.

A bracket 7 is mounted on the vehicle and projecting outwardly therefrom, this bracket being of a type which is commonly used and generally projected outwardly from the center of the rear of the vehicle. In the form shown in Fig. 1 the bracket 7 is connected to a suitable chair 11 which is secured to the central portion 8 of a disc having the concave portion 9. The disc is provided with the peripheral axially directed flange 10 on which the tire rim 12, which supports the spare tire 13, may be mounted. A housing 14 having the opening 15 in its rearwardly directed side which is closed by the lens 16 is provided with a plurality of spaced legs 17 by which the housing is mounted on the disc at the central portion. The rear of the housing is closed by the lens 18 so that the light rays from the light bulb 19 may be directed through the lens 16 to serve as an ordinary tail light while at the same time light rays may be directed through the lens 18 to strike the disc so as to be reflected from the concave portion 9. This portion of the disc is preferably highly burnished and painted red or a similar color so that the reflected light rays may be quite noticeable.

With a device constructed in this manner the tire carrier itself therefore, serves as a reflecting body so that a vehicle approaching a vehicle on which the invention is mounted would observe the large illuminated colored disc, thus affording greater protection to the occupants of both vehicles.

In Fig. 3 the bracket 7 is attached to a flat central portion 8' of the disc having the concave portion 9' with the axially directed flange 10'. The housing 14' is provided with the openings 20 and 21, each closed by lenses 22 and 23 respectively. A partition 24 serves to divide the housing into the upper compartment 25 and the lower compartment 26. This lower compartment has an opening 28 closed by the transparent closure 29 so that light rays from the light bulb 30 may serve to illuminate the license plate suspended on the depending tongue 31. A light bulb 32 is mounted in the compartment 25 so as to serve the functions of a stop light, the light bulb 30 serving the functions of a tail light. These light bulbs are mounted on the partition 33 which also serves as a support for the light bulb 34, the light rays from which may shine through the lens 35 on to the reflecting disc.

While I have illustrated and described the preferred form of my invention, I do not wish to limit myself to the precise details of structure shown but desire to avail myself of such variations and modifications as may come within the scope of the appended claim.

Having thus described my invention, what I claim as new and desire to secure by Letters Patent is:

A combination tire carrier and reflecting body, comprising: a bracket; a tire carrying and light reflecting disc mounted on said bracket; a housing; a light in said housing; a transparent closure for the rear of said housing; legs projecting rearwardly of said housing and secured to the light reflecting outer face of said disc for maintaining said housing spaced outwardly from and positioned centrally of said disc.

In testimony whereof I have signed the foregoing specification.

FRANK A. CECIL.